(12) United States Patent
Ide et al.

(10) Patent No.: US 7,243,672 B2
(45) Date of Patent: Jul. 17, 2007

(54) FLOW CONTROL VALVE

(75) Inventors: Norikazu Ide, Tokyo (JP); Tomoyuki Fujita, Tokyo (JP); Hideyasu Ihira, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 247 days.

(21) Appl. No.: 11/080,662

(22) Filed: Mar. 16, 2005

(65) Prior Publication Data
US 2005/0211296 A1    Sep. 29, 2005

(30) Foreign Application Priority Data
Mar. 24, 2004  (JP) ............... 2004-085946
Nov. 8, 2004   (JP) ............... 2004-323650

(51) Int. Cl.
*F16K 11/07* (2006.01)

(52) U.S. Cl. .................. 137/115.15; 137/115.05

(58) Field of Classification Search ........ 137/115.05, 137/115.04, 115.13, 115.14, 115.15, 115.18
See application file for complete search history.

(56) References Cited

U.S. PATENT DOCUMENTS

| | | | | |
|---|---|---|---|---|
| 3,006,365 A | * | 10/1961 | Duffy ................ | 137/115.13 |
| 3,424,057 A | * | 1/1969 | Schweizer .......... | 137/115.13 |
| 3,885,583 A | * | 5/1975 | Tennis ............... | 137/115.15 |
| 4,002,027 A | * | 1/1977 | Eley et al. ......... | 137/115.04 |
| 4,693,273 A | * | 9/1987 | Reynolds et al. ... | 137/115.13 |

FOREIGN PATENT DOCUMENTS

JP    08-074749    3/1996

* cited by examiner

*Primary Examiner*—Stephen M. Hepperle
(74) *Attorney, Agent, or Firm*—Rabin & Berdo, PC

(57) ABSTRACT

A spool bore (4) where a spool (6) slides, a concave portion (23) opened to the spool bore (4) and facing a return port 12 opened to the spool bore (4), and a land portion (11) disposed in an outer periphery of the spool (6) are provided. A width of the concave portion (23) and a width of the return port (12) each are greater than a width of the land portion (11) and a groove bottom (23*a*) of the concave portion (23) is formed to be a flat plane generally in proportion to an axis line of the spool (6).

3 Claims, 7 Drawing Sheets

FLOW CONTROL VALVE

BACKGROUND OF THE INVENTION

1. Field of the Invention

The present invention relates to a flow control valve which controls a supply flow quantity of fluid to an actuator in accordance with movement of a spool therein.

2. The Related Art of the Invention

There is known this kind of a flow control valve described in Japanese Unexamined Patent Publication No. 8-74749. FIG. 6 shows the flow control valve in which a spool bore 4 is formed in a valve body 1 and a spool 6 is slidably incorporated in the spool bore 4.

A pump port 2, as well as a supply port 3 are positioned in a way so as to be connected to the spool bore 4. The pump port 2 is connected to a discharge side of a vane pump (not shown) and the supply port 3 is connected to an actuator (not shown).

A set spring 5 is pressed against an end of the spool 6, which is displaced by balance of this spring force and a pump discharge pressure supplied from the pump port 2.

A control rod portion 7 is disposed coaxially with the spool 6 therein, extending into a side of the supply port 3, and inserted into a communicating hole 8 of a partition wall formed in the spool bore 4, thus providing a main orifice 9 by a clearance between the control rod portion 7 and the communicating hole 8. An opening of the main orifice 9 varies with the movement of the spool 6 and a flow quantity of fluid introduced in the supply port 3 is determined in accordance with this main orifice opening.

Further, a return port 12 is connected to the spool bore 4 and a reservoir (not shown). A land portion 11 is formed in the outer periphery of the spool 6 and a circular groove 10 is formed adjacent the land portion 11.

When the spool 6 is positioned in such a way that the land portion 11 closes the return port 12, an entire quantity of the fluid sent from the pump port 2 flows through the main orifice 9 to the supply port 3, and on the other hand, when the land portion 11 opens a part of the return port 12, a part of the fluid is returned back from the return port 12 to the reservoir.

FIG. 7 shows flow characteristics of a pump discharge quantity of the fluid controlled by the flow control valve. The discharge quantity of the pump (not shown) increases in proportion to a pump rotation speed, and the flow control valve is adapted to control a flow quantity of the fluid supplied to the supply port 3 to be constant after the pump rotation speed reaches a predetermined value.

When an increase in the rotation speed N of the pump causes the discharge quantity Q of the pump to increase, a flow resistance of the fluid is also increased when the fluid flows from the pump port 2 through the main orifice 9 to the supply port 3, thereby increasing a pressure upstream of the main orifice 9. This allows the pressure acting on the end face of the spool 6 to move the spool 6 in the direction shown in an arrow Y against the set spring 5. The movement of the spool 6 causes the land portion 11 to open the return port 12. As a result, a part of a discharge quantity of the fluid from the pump port 2 is returned back from the return port 12 to the reservoir as an extra flow quantity, thus controlling the flow quantity of the fluid to the supply port 3.

An increase in pressures upstream of the main orifice 9 causes a movement amount of the spool 6 to increase, whereby an opening of the return port 12 is also increased, thus increasing the extra flow quantity of the fluid to be back to the reservoir.

Therefore, a supply flow quantity of the fluid passing through the main orifice 9, as shown in FIG. 7, is adjusted to be a preset value in accordance with rotation speeds of the pump. Herein FIG. 7, as an example, shows the characteristics that the supply flow quantity is constant regardless of the rotation speeds of the pump.

A concave portion 13 is formed in a valve body 1 at a position in the direction extending from the return port 12 in such a way that the concave portion 13 is opened to the spool bore 4.

The concave portion 13 has a diameter having the same dimension as a diameter of the return port 12 and is processed together with the process of the return port 12 by a drill used in forming the return port 12. Therefore, a cone face 13a is formed in a center of the concave portion 13, corresponding to the cutting edge of the drill.

A width L1 of the concave portion 13 in the axis line of the spool 6 is formed greater than a width L2 of the land portion 11 in the axis line of the spool 6. Note that a width L3 of the return port 12 in the axis line of the spool 6 is equal to the width L1 of the concave portion 13.

The reason why in the flow control valve the circular groove 10 is thus disposed in the spool 6 and the concave portion 13 is positioned facing the return port 12, and the width L1 of the concave portion 13 is greater than the width L2 of the land portion 11 is as follows.

The first reason is to improve a pressure balance in the circumferential direction of the spool 6. Opening the return port 12 allows a part of the operating fluid from the pump port 2 to flow into the return port 12 as shown in "f1" of FIG. 6. Then, a pump discharge pressure or a pressure close to it is applied on a side face of the spool 6 facing the return port 12. This situation leads to a state where, in regard to the spool 6, an offset load is applied to the spool 6 in one direction of the circumferential face, thereby deteriorating the balance of the spool 6. As the concave portion 13, however, is disposed as described above, the flow "f2" passing through the concave portion 13 other than the flow "f1" occurs. As a result, the pressure the same as the above-mentioned pressure is applied in the opposing direction on the outer periphery of the spool 6, whereby the operating forces generated by these fluid forces are cancelled out with each other, improving the balance of the forces in the circumferential direction of the spool 6.

The second reason is to reduce friction acting on the spool 6.

As explained in the first reason, application of the offset load to the spool 6 causes the friction between the spool 6 and the spool bore 4 to increase corresponding to the offset load. Such occurrence of the friction leads to deterioration of the axial movement of the spool 6. In case the spool 6 does not move in the axial direction smoothly, a spring force of the set spring 5 is required to increase when the spool 6 moves in the right direction in FIG. 6, namely in the returning direction.

An increase in the spring force of the set spring 5, however, causes the pump inner pressure to be highly maintained, resulting in an increase in energy losses. Accordingly, an increase in the spring force of the set spring 5 is in fact limited to a certain degree. In order to solve such problem, the circular groove 10 is disposed adjacent the land portion 11, thereby reducing a contact area between the spool bore 4 and the spool 6. And the width L1 of the concave portion 13 is greater than the width L2 of the land portion 11, whereby when the return port 12 is opened, the flow "f2" passing through the concave portion 13 is ensured.

Accordingly the offset load exerting on the spool 6 is reduced, thus reducing the friction.

SUMMARY OF THE INVENTION

In the above-mention conventional flow control valve, since a shape of the groove bottom in the concave portion 13 is a cone face 13a, the following problems occur.

For example, as shown in FIG. 6, as the clearance between the land portion 11 and the return port 12 is set as an orifice S1, and the clearance between the land portion 11 and the concave portion 13 is set as an orifice S5, the orifice S1 increases one-sidedly in accordance with the movement amount of the spool 6. The orifice S5, however, increases until the land portion 11 of the spool 6 reaches the central point of the concave portion 13, and thereafter, decreases reversely.

This is because the bottom shape of the concave portion 13 is the cone face 13a, and the clearance formed between the right shoulder 11a of the land portion 11 and the cone face 13a becomes the minimum orifice until the land portion 11 reaches the central point of the concave portion 13, and the clearance formed between the left shoulder 11b of the land portion 11 and the cone face 13a becomes the minimum orifice after the land portion 11 reaches the central point of the concave portion 13.

FIGS. 8 to 10 show a relation between a movement amount of the spool 6 and an opening in each of the orifices 9, S1, and S5.

As shown in FIG. 8, an opening of the main orifice 9 becomes smaller as the spool 6 moves against the set spring 5. An opening of the orifice S1, however, as shown in FIG. 9, varies to be rapidly great on the contrary until a certain movement amount of the spool 6. An opening of the orifice 5, as shown in FIG. 10, until a certain movement amount, in other words, until the land portion 11 reaches the central point of the concave portion 13, varies to be rapidly great and after the land portion 11 passes through the central point of the concave portion 13, the opening of the orifice S5 varies to be rapidly small. Such rapid change of the opening of the orifice S5 is caused by a sharp angle of the cone face 13a. FIG. 11 shows the opening characteristic with respect to a sum of the openings of the orifices S1, S5. When the return port 12 is opened, the fluid flows into the reservoir through both the orifices S1, S5.

As seen from FIG. 11, there occur positions of the spool 6 where a sum of the openings of both the orifices S1, S5 does not nearly vary. This is due to an opening characteristic of the orifice S1 shown in FIG. 9 and an opening characteristic of the orifice S5 shown in FIG. 10. That is, in the movement process of the spool 6 the opening of the orifice S5 increases in the same way with the orifice S1 until the half way, and after the land portion 11 passes through the central point of the concave portion 13, the opening of the orifice S5 varies to be rapidly small. Accordingly an increase in the opening of the orifice S1 is cancelled out with a decrease in the opening of the orifice S5, thus producing the region where the sum of the openings as described above does not nearly vary.

If the region where the sum of the openings as described above does not vary in regard to the movement of the spool 6 becomes long, as a result it also affects a flow characteristic of the fluid shown in FIG. 7. Namely the movement amount of the spool 6 does not vary in proportion to a change in pressures upstream of the main orifice 9 generated against the set spring 5, producing instability of the movement of the spool 6. As a result, the characteristic of the flow quantity supply to the side of the supply port 3 by the flow control valve becomes unstable.

It is an object of the present invention to provide a flow control valve with a stable flow supply characteristic.

In order to achieve above the object the invention provides a flow control valve which comprises a valve body, a spool slidably disposed in a spool bore formed in the valve body, a pump port, a supply port, and return port connected to the spool bore respectively, wherein a part of an operating fluid introduced from the pump port to the supply port is returned back from the return port according to a displacement of the spool. The flow control valve comprises, a concave portion opened to the spool bore and facing the return port opened to the spool bore, a land portion disposed in an outer periphery of the spool, a circular groove disposed adjacent the land portion in an outer periphery of the spool, and a set spring urging the spool in the axial direction against an operating fluid pressure in the pump port, wherein a width of the concave portion and a width of the return port are greater than a width of the land portion, a groove bottom of the concave portion is formed to be a flat plane generally in parallel to an axis line of the spool, and when the spool moves against the set spring, the return port and the concave portion are opened simultaneously by the land portion, thereby flowing a part of the operating fluid via the concave portion and the circular groove to the return port.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

The preferred embodiment according to the invention will be explained below referring to the drawings, wherein.

DETAILED DESCRIPTION OF THE PREFERRED EMBODIMENT

The selected embodiment of the present invention will now be explained with reference to the drawings. It will be apparent to those skilled in the art from this disclosure that the following description of the embodiment of the present invention is provided for illustration only, and not for the purpose of limiting the invention as defined by the appended claims and their equivalents.

A preferred embodiment of the present invention shown in FIG. 1 will be explained.

Figure 1:
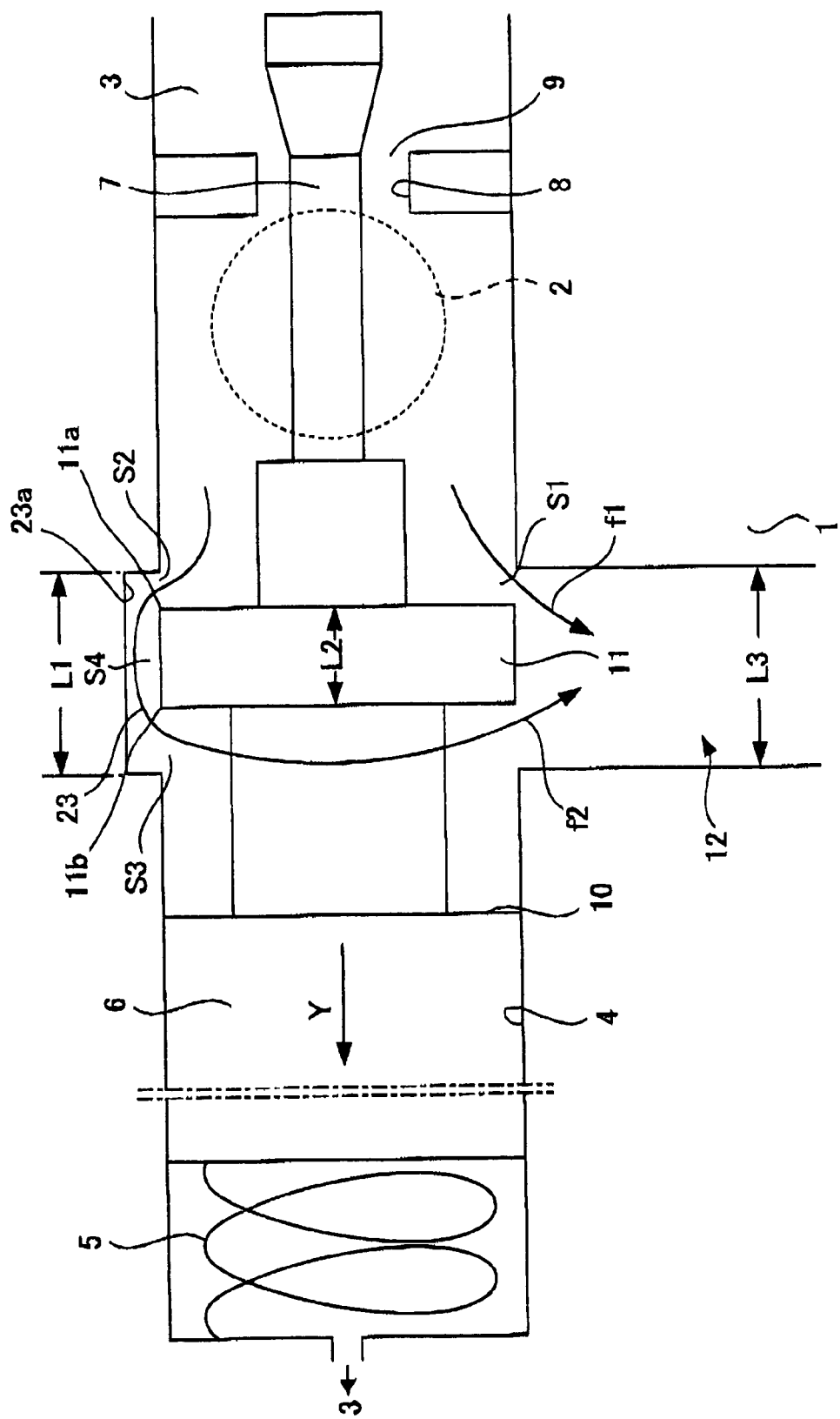
FIG. 1 is a structural view showing a preferred embodiment of the present invention.

As shown in FIG. 1, in the present invention, a groove bottom 23a of a concave portion 23 is formed in a flat shape, different from the conventional cone face. Namely the groove bottom 23a is formed generally in parallel to and along an axis line of the spool 6. Thus forming the groove bottom 23a in parallel to the axis line of the spool 6 causes clearances between the top face of the land portion 11 and the groove bottom 23a to be constant substantially at any moving position of the spool 6.

When the movement of the spool 6 allows the concave portion 23 to start to be opened, an area of a clearance with one end of the land portion 11 gradually increases, but after this area corresponds to an opening area between the top face of the land portion 11 and the flat groove bottom 23a of the concave portion 23, even if the spool 6 further moves, an effective opening area therebetween does not change, namely a fixed orifice is formed. An effective stroke range of the fixed orifice ends based upon when a clearance area between the other end of the land portion 11 and the concave portion 23 becomes smaller than the opening area of the fixed orifice by the further movement of the spool 6.

Herein a clearance between the concave portion 23 and a right shoulder 11a in FIG. 1 is set as a second variable orifice S2, a clearance between the concave portion 23 and a left shoulder 11b of the land portion 11 in FIG. 1 is set as a third variable orifice S3, and a clearance between the concave portion 23 and the top face of the land portion 11 is set as a fixed orifice S4.

And if a width of the concave portion 23 in the axial direction of the spool 6 is L1, a width of the land portion 11 in the axial direction is L2, and a width of the return port 12 is L3, the concave portion 23, the land portion 11, and the return port 12 are constructed in such a way that a relation of (L1=L3)>L2 is maintained. Note that a cross section of each of the return port 12 and the concave portion 23, perpendicular to an axis of the return port 12 is a circular cross section.

Figure 6:
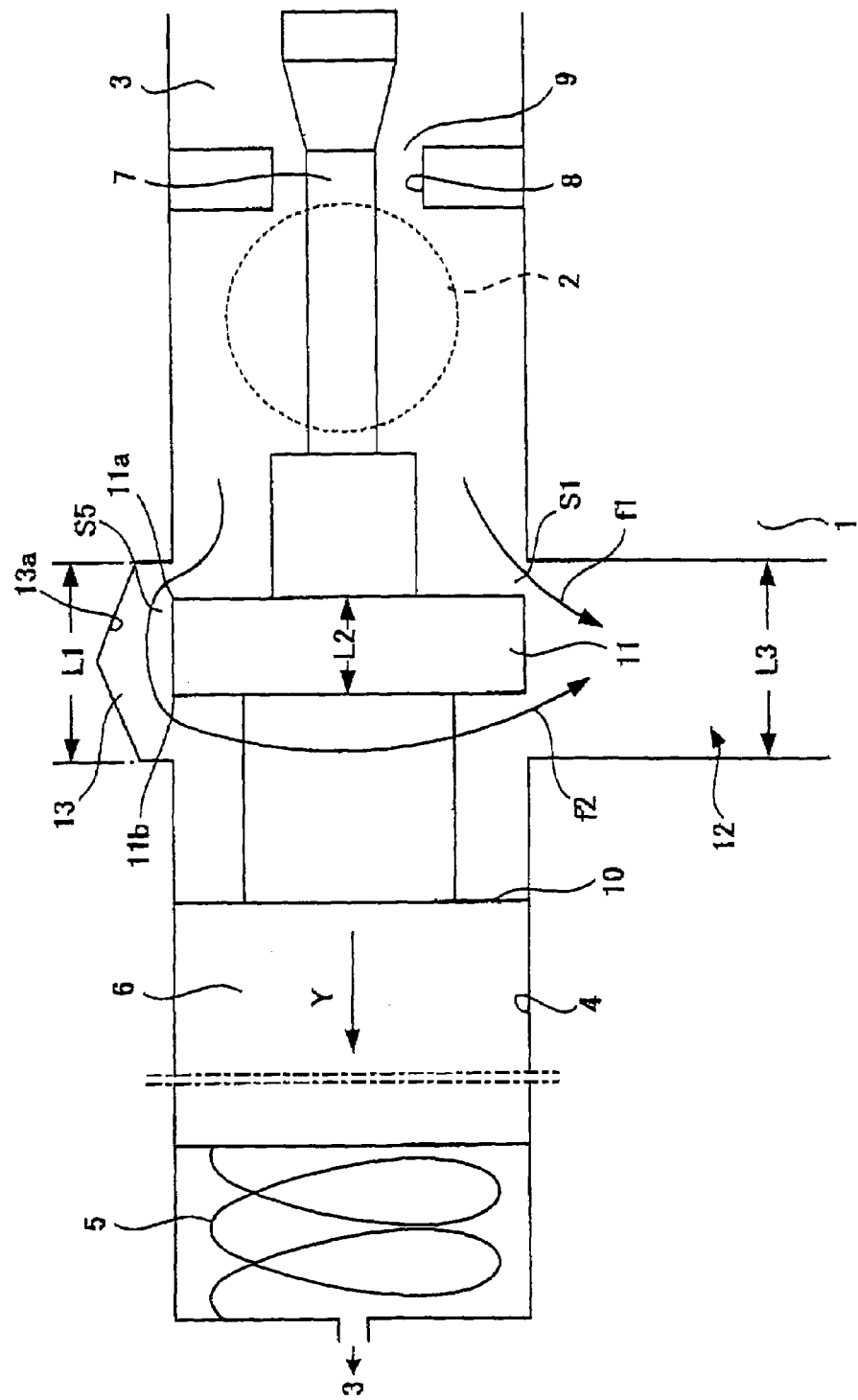
FIG. 6 is a structural view showing the conventional flow control valve.
Figure 7:
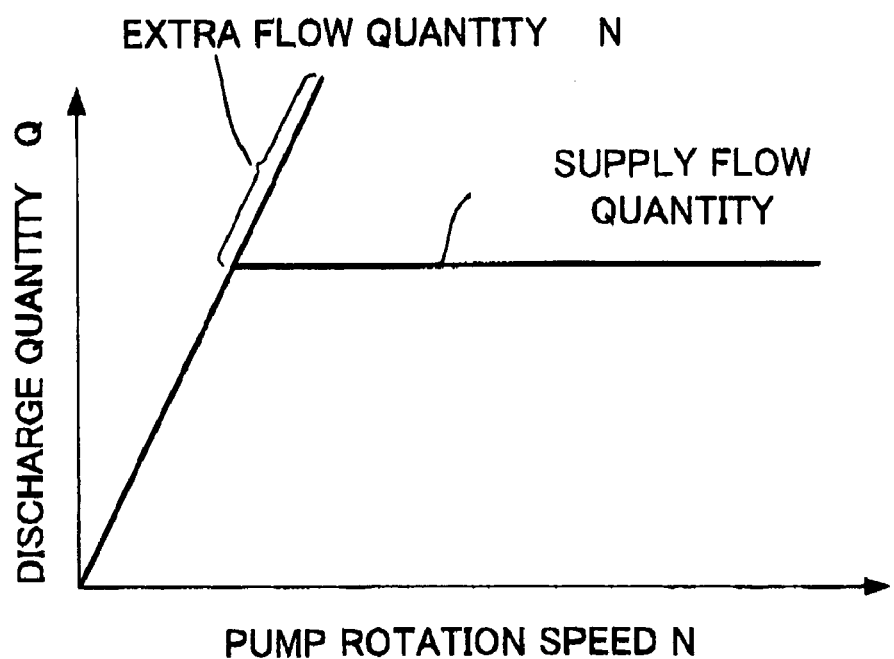
FIG. 7 is a graph showing a relation between a rotation speed N and a discharge amount Q of the conventional pump.
Figure 8:
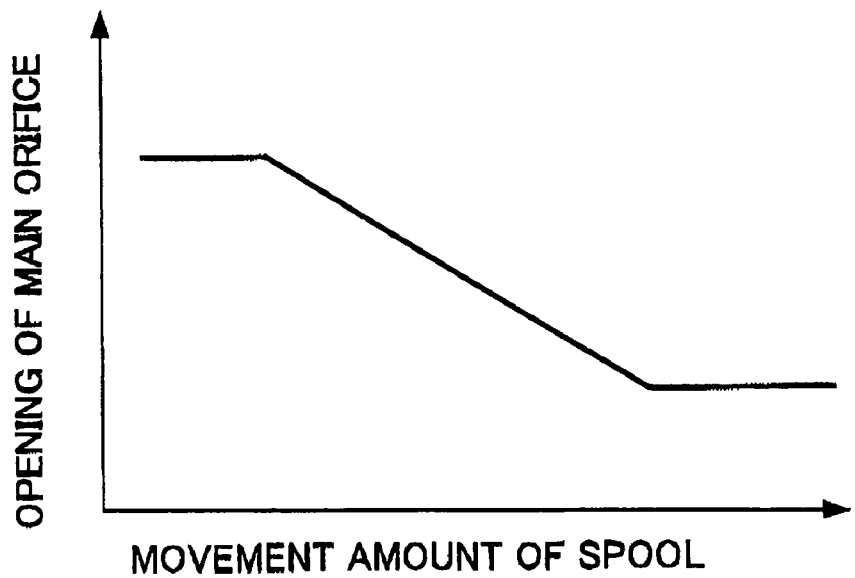
FIG. 8 is a graph showing an opening characteristic of the conventional main orifice.
Figure 9:
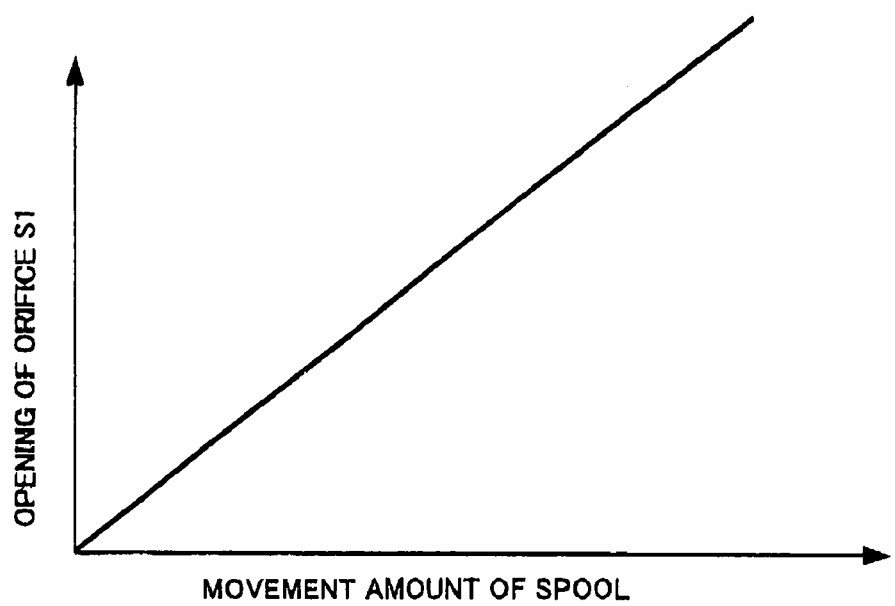
FIG. 9 is a graph showing an opening characteristic of a first orifice provided in a side of the conventional return port.
Figure 10:
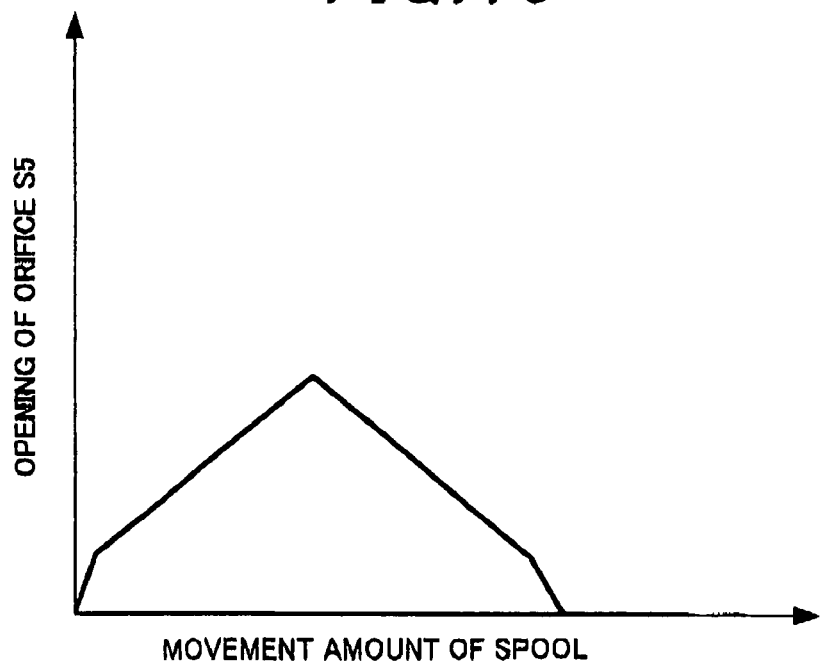
FIG. 10 is a graph showing an opening characteristic of a second orifice provided in a side of the conventional concave portion.
Figure 11:
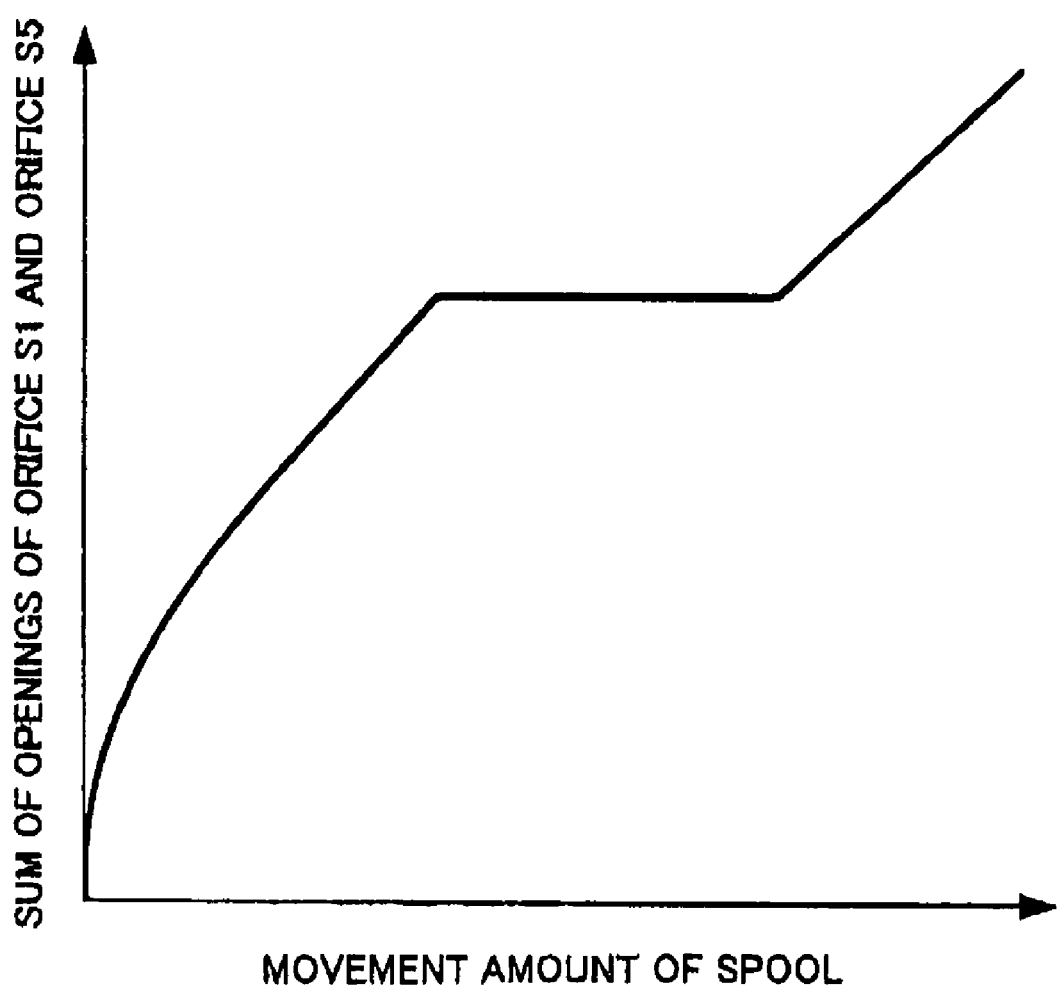
FIG. 11 is a graph showing an opening characteristic of a sum of openings of the conventional first orifice and second orifices.

The other components as the flow control valve are identical to those in FIG. 6. Accordingly in the explanation of the present preferred embodiment, components identical to those in the conventional flow control valve are referred to as identical numerals.

Figure 2:
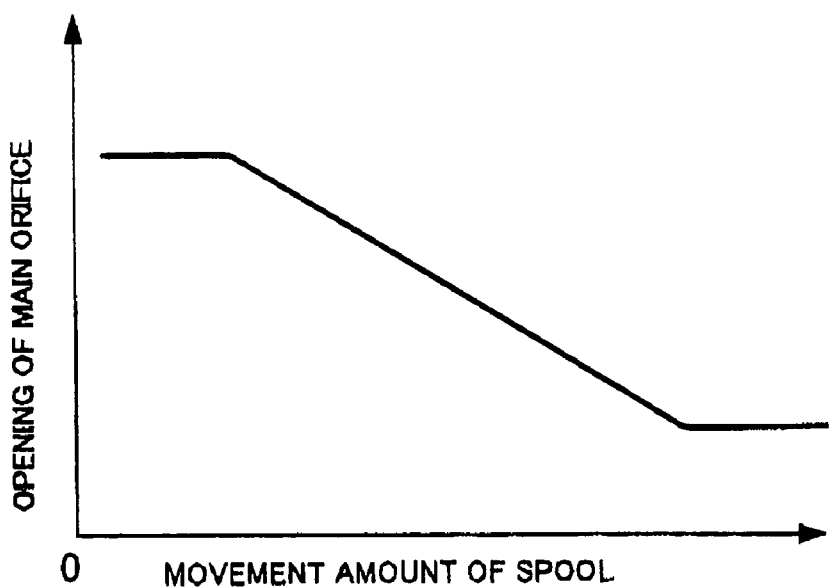
FIG. 2 is a graph showing an opening characteristic of a main orifice.
Figure 3:
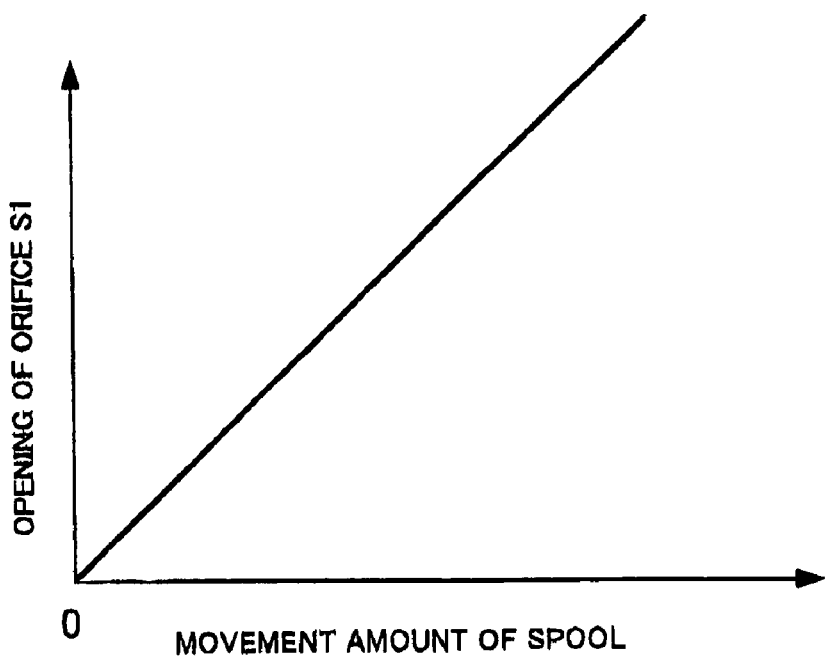
FIG. 3 is a graph showing an opening characteristic of a first orifice provided in a side of a return port.

First, FIG. 2 shows an opening characteristic of the main orifice 9 in which as the spool 6 moves in the left direction against the set spring 5 in FIG. 1, the opening of the main orifice 9 becomes smaller. And an opening of the first orifice S1 formed between the return port 12 and the land portion 11, as shown in FIG. 3, becomes greater, as the spool 6 moves against the set spring 5 as described above.

Figure 4:
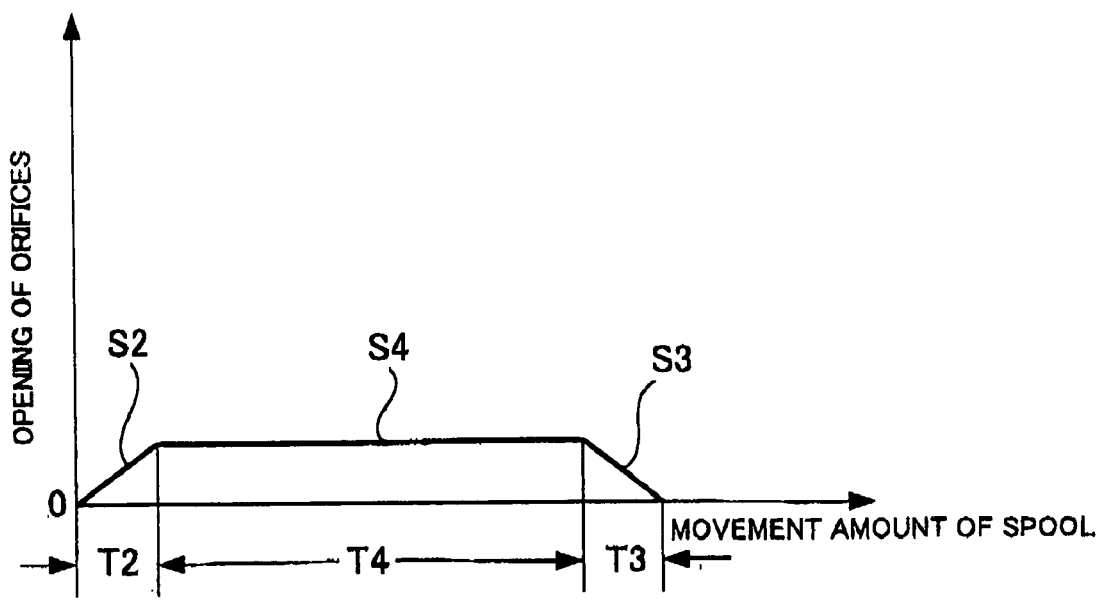
FIG. 4 is a graph showing an opening characteristic of a second orifice provided in a side of a concave portion.

An effective opening characteristic of the second orifice S (S2, S3, and S4) formed in a side of the concave portion 23 is shown in FIG. 4.

That is, when the spool 6 moves in the same direction with the above, first the second variable orifice S2 starts to open and the opening area of the second variable orifice S2 increases with the movement of the spool 6. When the spool 6 moves by the movement amount T2, the opening area of the second variable orifice S2 becomes equal to that of the fixed orifice S4, and thereafter, even if the spool 6 moves further, the second variable orifice S2 does not serve as an orifice and in the range of a predetermined movement amount T4, the fixed orifice S4 an opening area of which does not change serves as an orifice.

When the movement of the spool 6 reaches the movement amount T4, an opening area of the fixed orifice S4 becomes equal to that of the third variable orifice S3. The third variable orifice S3 serves as an orifice in the range of the movement amount T3 from when the opening area of the third variable orifice S3 becomes equal to that of the fixed orifice S4 to when the third variable orifice S3 becomes completely closed.

In a side of the concave portion 23, influences of the second and third variable orifices S2, S3 are reduced to be as small as possible, which leads to stability of the flow characteristic of the fluid as the flow control valve, but the influences of the second and third variable orifices S2, S3 changing with an opening (opening area) depending on the movement amount of the spool 6 can not be reduced to zero until the fixed orifice S4 serves as an effective orifice.

In this case, if the opening of the fixed orifice S4 is made to be as small as possible, the maximum opening can be small with the inclination angles of the second and third variable orifices S2, S3 in FIG. 4 still maintained. As a result the axial movement amount of the spool 6 during an effective functioning of the fixed orifice S4 becomes increased, thereby reducing the influences of the second and third variable orifices S2, S3.

Therefore, in the preferred embodiment an opening area of the fixed orifice S4 is set to be sufficiently small. Namely in detail when the spool 6 moves to a position where a center of the land coincides with the center of the return port, a relation in opening areas between the first orifice S1 and the fixed orifice S4 is to be "S1/S4≧2. When the opening area of the fixed orifice S4 is made to be smaller than the opening area of the first orifice S1 thus, the influences of the second and third variable orifices S2, S3 can be reduced. Note that even if an opening of the fixed orifice S4 is made to be small, an entire pressure balance is maintained sufficiently because of the circular groove 10.

Figure 5:
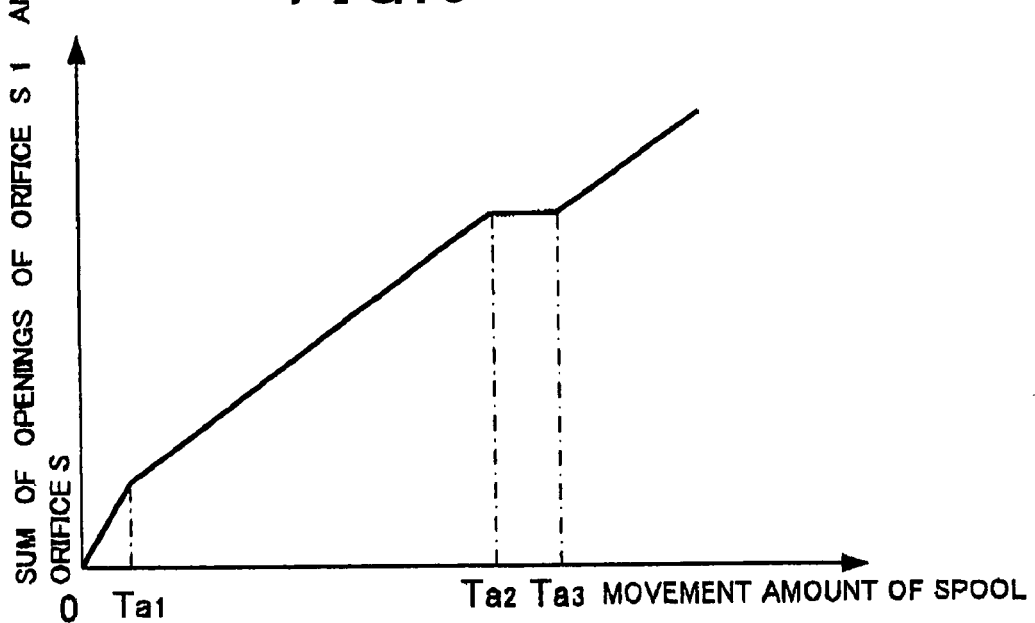
FIG. 5 is a graph showing an opening characteristic of a sum of openings of the first orifice and the second orifice.

FIG. 5 shows a relation of a sum of the opening of the first orifice S1 and the opening of the second orifice S (one of the smallest orifices S2-S4) in a returning side of the fluid with respect to the movement of the spool 6.

From seen in FIG. 5, since the first orifice S1 and the second variable orifice S2 simultaneously start to open until the spool movement amount Ta1, the inclination of the opening characteristic is steep. And in the range of Ta1 to Ta2 of the movement, the total opening characteristic is made by adding a constant opening of the fixed orifice S4 to an opening changing amount of the first orifice S1. Accordingly in the range Ta1-Ta2 of the movement, the inclination of the opening characteristic is slower than the inclination made until the movement amount Ta1. The range of Ta1 to Ta2 of the movement corresponds to the range of the fixed orifice S4 and occupies a large part of the effective movement range.

Further, the third variable orifice S3 is reduced to be closed in the range of Ta2 to Ta3 of the movement, thereby canceling an increase amount in the opening of the first orifice S1. The inclination of the opening characteristic in the range of Ta2 to Ta3 is slower than that in the range of Ta1 to Ta2. In this case, when an opening increase amount of the first orifice S1 is the same as that of the third variable orifice S3, the opening characteristic becomes substantially constant. Note that the range of Ta2 to Ta3 is equal to the range of the third variable orifice S3 and the effective range thereof is narrow.

Further, after the movement amount Ta3, the opening characteristic is an increase amount in the opening of the first orifice S1 alone. Note that since the concave portion 23 is completely closed, an offset load caused by the fluid force acting on the spool 6 becomes greater. Accordingly, it is preferable that a normal effective stroke range of the flow control valve is set as a range to a point where the third variable orifice S3 closes.

As described above, according to the preferred embodiment of the present invention, the groove bottom 23a of the concave portion 23 is disposed in parallel to an axis line of the spool 6 and a large part of the second orifice S formed between the concave portion 23 and the land portion 11 is set as the fixed orifice S4. As a result, an opening amount of the second orifice S changing with the movement position of the spool 6 can be small. Accordingly, a total opening of the orifices forming the opening characteristic in the return side of the fluid, namely a sum of the areas of the first orifice S1 in the side of the return port 12 and the second orifice S (one of S2-S4) in the side of the concave portion 23 changes in proportion to the movement of the spool 6 in a large part of the effective movement range. Accordingly an extra discharge amount of the pump drained to the return port 12 is controlled in proportion to the movement amount of the spool 6, thereby stabilizing the control characteristic of the flow quantity of the fluid supplied to the supply port 3.

The present invention is not limited to the above-described embodiment, but it is apparent to those skilled in the art that the present invention includes various improvements and modifications within the scope of the technical concept of the present invention as defined in the appended claims.

What is claimed is:

1. A flow control valve, comprising a valve body; a spool slidably disposed in a spool bore formed in the valve body; a pump port, a supply port, and return port connected to the spool bore respectively; wherein a part of an operating fluid introduced from the pump port to the supply port is returned back from the return port according to a displacement of the spool, the flow control valve comprising:

a concave portion opened to the spool bore and facing the return port opened to the spool bore;

a land portion disposed in an outer periphery of the spool;

a circular groove disposed adjacent the land portion in an outer periphery of the spool;

a control rod portion attached coaxially with the spool to control a flow quantity of fluid to the supply port; and a set spring urging the spool in the axial direction against an operating fluid pressure in the pump port, wherein:

a width of the concave portion and a width of the return port are greater than a width of the land portion, a groove bottom of the concave portion is formed to be a flat plane generally in parallel to an axis line of the spool, and when the spool moves against the set spring, the return port and the concave portion are opened simultaneously by the land portion, thereby flowing a part of the operating fluid via the concave portion and the circular groove to the return port;

in a case the return port and the concave portion are opened by the land portion due to movement of the spool, a clearance formed between one end of the land portion and the return port, an area of which changes depending on the movement of the spool, is a first orifice (S1), and a clearance formed between a top face of the land portion and the groove bottom of the concave portion, an area of which does not change regardless of the movement of the spool, is a fixed orifice (S4), when the spool moves to a position where the center of the land portion coincides with the center of the return port, a relation between an opening area of the first orifice (S1) and an opening area of the fixed orifice (S4) is set as $(S1)/(S4) \geq 2$; and a clearance formed between the land portion and the concave portion, an area of which changes depending on the movement of the spool, is a second orifice (S), which includes the fixed orifice (S4), and a sum of the areas of the first orifice S1 and the second orifice S changes in proportion to the movement of the spool.

2. The flow control valve according to claim 1, wherein a cross section of each of the return port and the concave portion, perpendicular to an axis of the return port, is a circular cross section.

3. The flow control valve according to claim 1, wherein the part of an operating fluid introduced from the pump port to the supply port is returned back from the return port according to a displacement of the spool toward the set spring.

* * * * *